US011353327B2

(12) United States Patent
Chander et al.

(10) Patent No.: US 11,353,327 B2
(45) Date of Patent: Jun. 7, 2022

(54) INTERACTIVE INDOOR NAVIGATION FRAMEWORK

(71) Applicant: FUJITSU LIMITED, Kawasaki (JP)

(72) Inventors: Ajay Chander, San Francisco, CA (US); Ramya Malur Srinivasan, San Diego, CA (US)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 15/929,966

(22) Filed: May 31, 2020

(65) Prior Publication Data

US 2021/0372797 A1    Dec. 2, 2021

(51) Int. Cl.
*G01C 21/20*   (2006.01)
*G01C 21/36*   (2006.01)
*H04N 7/18*    (2006.01)
*G01C 21/34*   (2006.01)
*G06V 20/52*   (2022.01)

(52) U.S. Cl.
CPC ....... *G01C 21/206* (2013.01); *G01C 21/3484* (2013.01); *G01C 21/3667* (2013.01); *G06V 20/52* (2022.01); *H04N 7/181* (2013.01)

(58) Field of Classification Search
None
See application file for complete search history.

(56) References Cited

U.S. PATENT DOCUMENTS

2017/0372223 A1* 12/2017 Vaughn ............... G06F 16/9535
2018/0143025 A1*  5/2018 Kurata .................. G08G 1/005

FOREIGN PATENT DOCUMENTS

KR    20150131934 A  * 11/2015  ............ H04W 4/029

OTHER PUBLICATIONS

Bulent Tastan, Gita Sukthankar, Leveraging human behavior models to predict paths in indoor environments, Pervasive and Mobile Computing, vol. 7, Issue 3, 2011, pp. 319-330, ISSN 1574-1192,(https://www.sciencedirect.com/science/article/pii/S1574119211000289) (Year: 2011).*

(Continued)

*Primary Examiner* — James J Lee
*Assistant Examiner* — Sophia Antonia Skipper
(74) *Attorney, Agent, or Firm* — Fujitsu Patent Center (57) ABSTRACT

According to an aspect of an embodiment, operations include receiving user information comprising motion information associated with a group of users in a built environment and user preference information associated with a group of events hosted in the built environment. The operations further include receiving layout information associated with the built environment and schedule information associated with the group of events. The operations further include predicting event-specific action associated with each user based on the user information, and the layout and schedule information. The operations further include predicting a path for navigation towards an event location associated with one of the group of events based on the predicted event-specific action and historical movement information of the group of users. The operations further include selecting, from the predicted paths, one or paths for navigation and generating navigation suggestions based on the selected paths. The navigation suggestions are displayed on display devices.

20 Claims, 4 Drawing Sheets

(56) References Cited

OTHER PUBLICATIONS

Translation of KR-20150131934-A obtained from ESPACE.net (Year: 2015).*
Fusco, Giovanni & Coughlan, James. (2018). Indoor Localization Using Computer Vision and Visual-Inertial Odometry. 10.1007/978-3-319-94274-2_13.
Website: https://en.wikipedia.org/wiki/Simultaneous_localization_and_mapping (obtained Aug. 26, 2020).
Savva, Manolis, Abhishek Kadian, Oleksandr Maksymets, Yili Zhao, Erik Wijmans, Bhavana Jain, Julian Straub, Jia Liu, Vladlen Koltun, and Jitendra Malik. 2019. "Habitat: A Platform for Embodied AI Research." ArXiv Preprint ArXiv: 1904.01201.
Li, Yuke. 2019. "Which Way Are You Going? Imitative Decision Learning for Path Forecasting in Dynamic Scenes." In 2019 IEEE/CVF Conference on Computer Vision and Pattern Recognition (CVPR), 294-303.
Website: https://engineering.fb.com/ai-research/talk-the-walk-teaching-ai-systems-to-navigate-new-york-through-language/ Posted on Jul. 11, 2018 (Obtained Aug. 26, 2020).
Sun, Chen, Abhinav Shrivastava, Carl Vondrick, Rahul Sukthankar, Kevin Murphy, and Cordelia Schmid. 2019. "Relational Action Forecasting." In 2019 IEEE/CVF Conference on Computer Vision and Pattern Recognition (CVPR), 273-83.

* cited by examiner

INTERACTIVE INDOOR NAVIGATION FRAMEWORK

FIELD

The embodiments discussed in the present disclosure are related to an interactive indoor navigation framework.

BACKGROUND

With surging populations and growing demands, traversing through crowds has become more common than ever before. Indoor navigation allows people to navigate indoors, typically within buildings, such as hotels or market areas. As satellite-based navigation is almost non-existent in an indoor environment, other positioning methods may be used to enable indoor navigation for people looking for accurate navigation to particular locations of the indoor environment. Indoor navigation has many applications for personal navigation, commercial, retail, military, logistics, or other location-based industries. Common applications of indoor navigation can be found in robotic navigation inside facilities, like a warehouse or hospitals, or turn-by-turn navigation for individual users to navigate on train stations, airports, shopping centers, museums, or conference centers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of the disclosure, operations may include receiving user information that may indicate motion information associated with a group of users in a built environment and user preference information associated with a group of events hosted in the built environment. The operations may further include receiving layout information that may be associated with the built environment and receiving schedule information that may be associated with the group of events. The operations may further include predicting an event-specific action associated with each user of the group of users in the built environment based on the received user information, the received layout information, the received schedule information. The operations may further include predicting, for each user of the group of users, a path for navigation towards a first event location associated with one of the group of events based on the predicted event-specific action of each user of the group of users and historical movement information of the group of users inside the built environment. The operations may further include selecting, from the predicted paths for the group of users, one or more paths as one or more optimal options for navigation towards the first event location. The operations may further include generating one or more navigation suggestions based on the selected one or more paths and controlling one or more display devices to display the generated one or more navigation suggestions.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems for providing an interactive indoor navigation framework for navigation in indoor environments. With surging populations and growing demands, traversing through crowds has become more common than ever before. Conventional navigation solutions, such as web mapping services rely on various sources of location data, such as Global Navigation Satellite Systems (GNSS) receivers, mobile networks, or Wi-Fi for providing real-time traffic conditions and route planning for traveling by foot, car, bicycle, air, or public transportation. Such solutions are typically effective in navigating between two distant locations; however, they are not built for navigation in indoor environments, such as conference centers or outdoor market areas. This may be because these conventional solutions rely on location data which lacks precision or fails entirely inside indoor environments, such as multistory buildings, airports, alleys, parking garages, or underground locations.

Indoor navigation has many applications for personal navigation, commercial, retail, military, logistics, or other location-based industries. Typically, people need indoor navigation to find and navigate to a desired location in an indoor environment, such as a conference room, a restroom, or a banquet hall in a building. Conventional indoor navigation solutions typically rely on technologies, such as Bluetooth® beacon-based systems, receiver antenna array systems, Wi-Fi based systems, short-range radio signals, and ultra-wideband positioning systems.

As one example, multiple Bluetooth® low energy (BLE) beacons may be used for navigating in the indoor environment. Such beacons may be registered to a location in the indoor environment and may regularly broadcast their location information to nearby user devices, which may analyze the location information to assist the user in finding right directions to desired location in the indoor environment. As another example, applications for the indoor navigation, especially for robotic navigation, may implement simultaneously localization and mapping (SLAM). SLAM may refer to a computational problem of constructing or updating a map of an unknown environment while simultaneously keeping track of an agent's location within it. It uses approximation solution methods, such as a Kalman filter or a particle filter to track and update the location of the agent. Most of these conventional solutions focus on adapting the agent in navigating the environment and not on adapting the environment to aid in navigation.

According to one or more embodiments of the present disclosure, the technological field of indoor navigation system may be improved by configuring a system in a manner in which the system is able to provide an efficient solution for pedestrian navigation within the indoor environment. The solution may include collecting user information including motion information associated with a group of users in a built environment and user preference information associated with a group of events hosted in the built environment. Layout information associated with the built environment and schedule information associated with the group of events may also be collected. The solution may include predicting an event-specific action for each of the group of users based on the collected information. Based on the predicted event-specific action and historical movement information of the group of users, a path for each user may be predicted for navigation towards an event location associated with one of the group of events. From the predicted paths, the solution may include selecting one or more paths as optimal options for navigation towards the event location. Based on the selected one or more paths, suitable navigation suggestions may be generated and displayed on display devices in the built environment.

Contrary to conventional solutions, the disclosed solution factors in user's motion tracker information, user's event schedule, user's event-specific preferences, and layout information of the indoor environment to predict user's movement and provide suitable navigation suggestions inside the indoor environment. The solution may be useful for people who typically rely on structural layout maps of the indoor environment to navigate in the indoor environment and for people with a disability (e.g. visual impairment).

Conventional event planning apps focus on logistical management. such as for event planning, task creation, seating plan, marketing, program creation/scheduling, integrated calendars, chat application, or maintaining attendee database. Such applications don't provide an interface that aids in navigation, especially in indoor environment. In contrast, the present disclosure provides to fuse information contained in the event along with data about people's movement, their preferences to aid in navigation by adapting the environment.

Embodiments of the present disclosure are explained with reference to the accompanying drawings.

Figure 1:
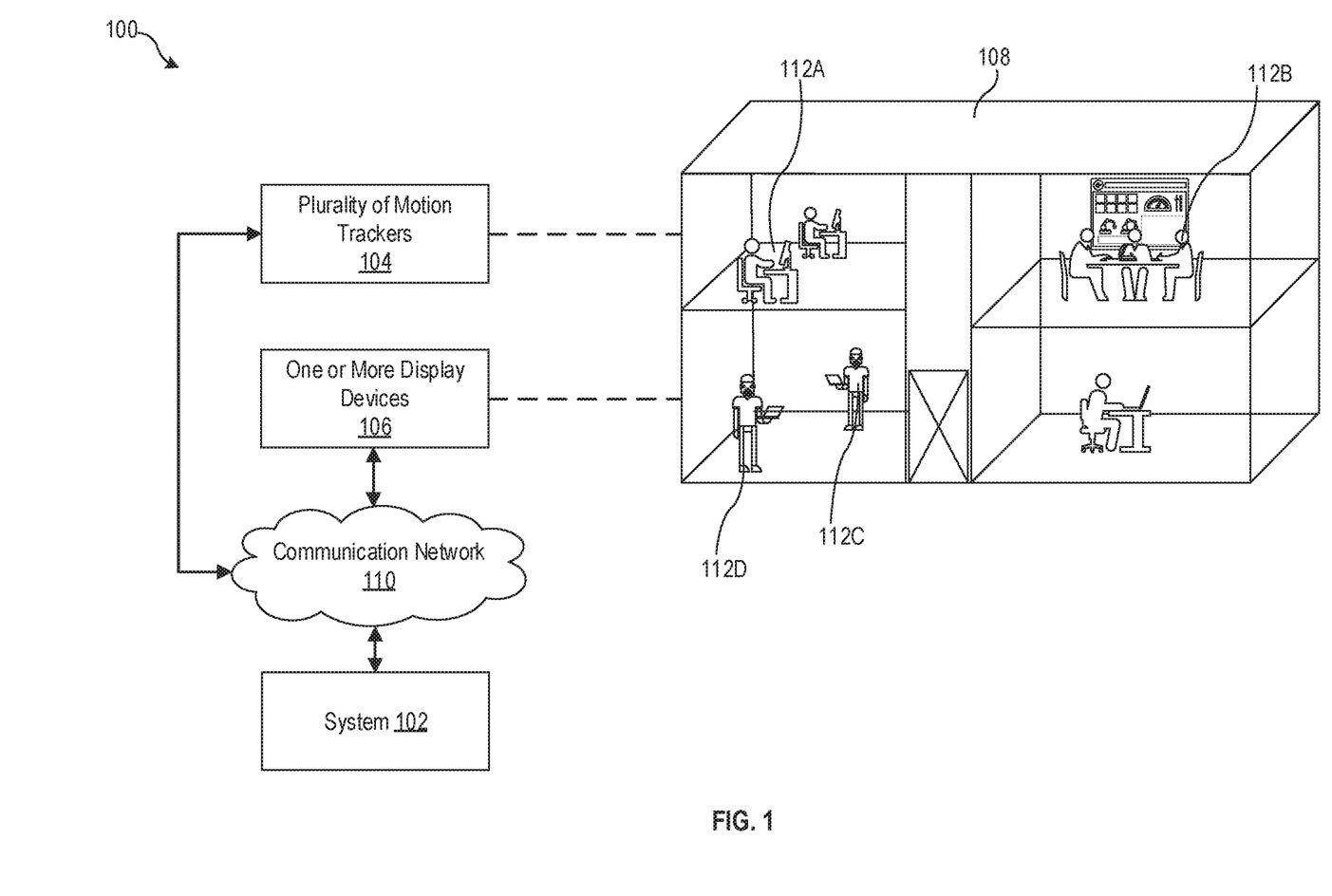
FIG. 1 is a diagram representing an example environment related to providing navigation suggestions in a built environment.

FIG. 1 is a diagram representing an example environment related to providing navigation suggestions in a built environment, arranged in accordance with at least one embodiment described in the present disclosure. With reference to FIG. 1, there is shown an environment 100. The environment 100 includes a system 102, a plurality of motion trackers 104, one or more display devices 106, and a built environment 108. The system 102, the plurality of motion trackers 104, and the one or more display devices 106 may be communicatively coupled to each other, via a communication network 110. In FIG. 1, there is further shown a group of users 112A, 112B, 112C and 112D in the built environment 108. The built environment 108 may refer to any predetermined place and space created or modified by people to serve their needs of accommodation, organization, or representation. As shown, for example, the built environment 108 is a multi-story office building. However, the disclosure may not be so limiting and may be applicable to other built environments. Examples of the built environment 108 may include, but are not limited to, a single-story building, a multi-story building, a conference building, an outdoor market area, a shopping mall, a theme park, a hotel, a theater, a stadium, an airport, a school, a park, or a hospital.

In one or more embodiments, the plurality of motion trackers 104 and the one or more display devices 106 may be located at a plurality of locations within the built environment 108. In these or other embodiments, one or more of the plurality of motion trackers 104 and the one or more display devices 106 may be associated with the group of users 112A, 112B, 112C, and 112D. For example, a user device (for example, a smartphone or a smartwatch) may act as a motion tracker and a display device for one of the group of users 112A, 112B, 112C, and 112D.

The system 102 may include suitable logic, circuitry, and interfaces that may be configured to receive user information associated with the group of users 112A, 112B, 112C, and 112D in the built environment 108. The received user information may include motion information associated with the group of users 112A, 112B, 112C, and 112D. In an embodiment, the system 102 may control the plurality of motion trackers 104 at a corresponding plurality of locations inside the built environment 108 to collect the motion information associated with the group of users 112A, 112B, 112C, and 112D. The plurality of motion trackers 104 may include a group of homogenous sensors or a group of sensors which act as disparate sources of the motion information. In an exemplary embodiment, each of the plurality of motion trackers 104 may be implemented as an image-capture device, such as a Closed-Circuit Television (CCTV) camera. Other example implementations of a motion tracker may include, but are not limited to, ultrasonic beacons, NFC/Bluetooth®, a depth sensor, a Light Detection and Ranging (LiDAR) sensor, a Radar sensor, an Inertial Measurement Unit (IMU), a user device with a capability to access a cellular network or a wireless local area network (WLAN), a Global Navigation Satellite System (GNSS) receiver, an Infrared (IR) sensor/Passive-IR sensor, an accelerometer, a gyroscope, or other sensors with ability to track human motion.

The received user information may also include user preference information associated with a group of events hosted in the built environment 108. Herein, each event may refer to an occasion which may be planned and scheduled to take place at a particular date-time and/or at a particular location in the built environment 108. For each user, the user preference information may include a user preference for one or more events of the group of events hosted in the built environment 108. Further details associated with the motion information and the user preference information are provided, for example, in FIG. 3.

The system 102 may further receive layout information associated with the built environment 108 and schedule information associated with the group of events. The schedule information may include an event location (e.g., a floor number, a hall number or name, and the like) and date-time information at which each event of the group of events may take place in the built environment 108. For example, the schedule information for a poster presentation event in a university campus (i.e. the built environment 108) may include an event location in terms of a building identifier (e.g., Tower 3), a floor number (e.g., $2^{nd}$), or a hall number/name (e.g., 202). The schedule information may also include date-time information (e.g., 23 Mar. 2020, 12:30 PM) associated with each event of the group of events. Further details on the schedule information and the layout information are provided, for example, in FIG. 3.

Based on the received user information, the received layout information, and the received schedule information, the system 102 may predict an event-specific action associated with each user of the group of users 112A, 112B, 112C, and 112D in the built environment 108. The event-specific action may be predicted from an action space which may include an exhaustive list of all possible event-specific actions. In one or more embodiments, for each user of the group of users 112A, 112B, 112C, and 112D, the event-specific action may indicate a maximum likelihood of movement of the corresponding user towards a location in the built environment 108. For example, an event-specific action may indicate that a movement of the user 112D towards a conference room.

The system 102 may predict, for each user of the group of users 112A, 112B, 112C, and 112D, a path for navigation towards a first event location associated with one of the group of events. Such prediction may be based on the predicted event-specific action of each user of the group of users 112A, 112B, 112C, and 112D and historical movement information of the group of users 112A, 112B, 112C, and 112D inside the built environment 108. Details associated with prediction of the event-specific action and the path for navigation are provided, for example, in FIG. 3.

From the predicted paths for the group of users 112A, 112B, 112C, and 112D, the system 102 may select one or more paths as one or more optimal options for navigation towards the first event location. Thereafter, the system 102 may generate one or more navigation suggestions based on the selected one or more paths. For example, if a selected path for the user 112D includes the use of an elevator to move from a ground floor to the first floor, then a navigation suggestion may be generated as "take the lift on the ground floor to move to first floor". Details of path selection and generation of navigation suggestions are provided, for example, in FIG. 3.

The system 102 may control the one or more display devices 106 to display the generated one or more navigation suggestions. In an embodiment, the one or more display devices 106 may be located at one or more locations in the built environment 108 to allow the group of users 112A, 112B, 112C, and 112D to view the generated one or more navigation suggestions. In another embodiment, the one or more display devices 106 may be personal user devices which may display personalized navigation suggestion to each user of the group of users 112A, 112B, 112C, and 112D. The one or more display devices 106 may be realized through several known technologies such as, but not limited to, at least one of a Liquid Crystal Display (LCD) display, a Light Emitting Diode (LED) display, a plasma display, or an Organic LED (OLED) display technology, or other display devices.

It should be noted that the communication among the system 102, the plurality of motion trackers 104, and the one or more display devices 106 may be performed via the communication network 110. The communication network 110 may include a communication medium through which the system 102 may communicate with the plurality of motion trackers 104, the one or more display devices 106, or other communication devices. Details of such communication devices are omitted from the disclosure for the sake of brevity. Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In FIG. 1, the plurality of motion trackers 104 and the one or more display devices 106 are shown as two separate entities from the system 102. However, in certain exemplary embodiments, the entire functionality of the plurality of motion trackers 104 and the one or more display devices 106 may be incorporated in the system 102, without deviating from the scope of the disclosure.

Figure 2:
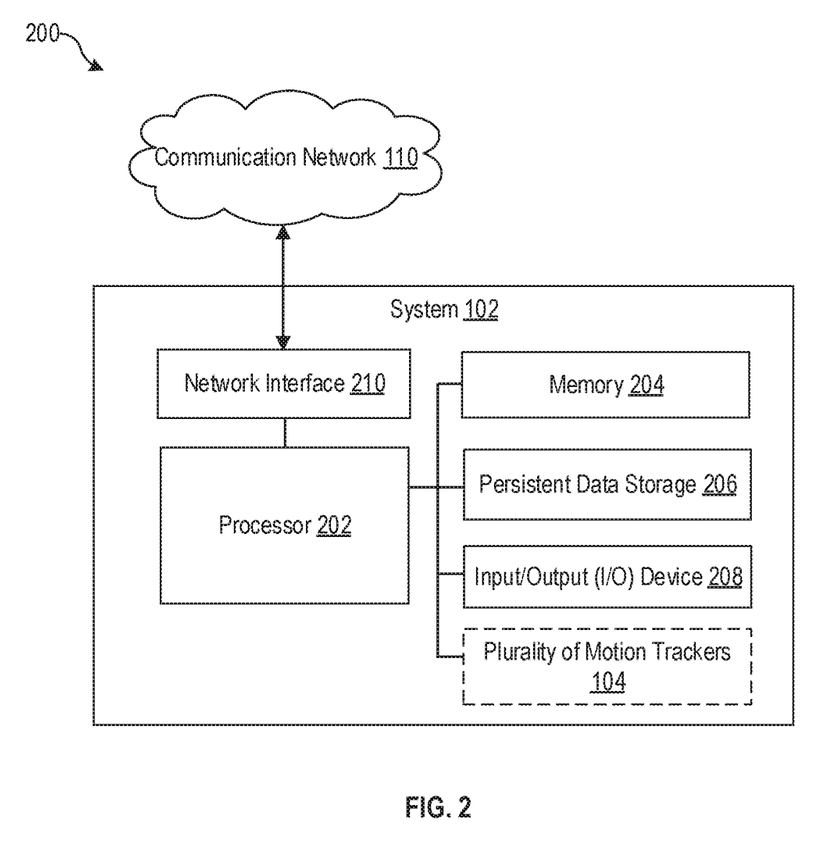
FIG. 2 is a block diagram of a system for providing navigation suggestions in a built environment.

FIG. 2 is a block diagram of a system for providing navigation suggestions in a built environment, arranged in accordance with at least one embodiment described in the present disclosure. FIG. 2 is explained in conjunction with elements from FIG. 1. With reference to FIG. 2, there is shown a block diagram 200 of the system 102. The system 102 may include a processor 202, a memory 204, a persistent data storage 206, an input/output (I/O) device 208, and a network interface 210. In one or more embodiments, the system 102 may also include the plurality of motion trackers 104.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more different electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a GPU, a CPU, a RISC processor, an ASIC processor, a CISC processor, a co-processor, and/or a combination thereof.

The memory 204 may include suitable logic, circuitry, and/or interfaces that may be configured to store program instructions executable by the processor 202. In one or more embodiments, the memory 204 may store user information including the motion information associated with the group of users 112A, 112B, 112C, and 112D in the built environment 108 and the user preference information associated with the group of events. In one or more embodiments, the memory 204 may also store the layout information associated with the built environment 108 and the schedule information associated with the group of events. In one or more embodiments, the memory 204 may also store the historical movement information of the group of users 112A, 112B, 112C, and 112D inside the built environment 108. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. The persistent data storage 206 may include computer-readable storage media for carrying or having computer-executable instructions or data structures stored thereon. Such computer-readable storage media may include any available media that may be accessed by a general-purpose or a special-purpose computer, such as the processor 202.

By way of example, and not limitation, such computer-readable storage media may include tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or a special-purpose computer. Combinations of the above may also be included within the scope of computer-readable storage media. Computer-executable instructions may include, for example, instructions and data configured to cause the processor 202 to perform a certain operation or a group of operations associated with the system 102.

The I/O device 208 may include suitable logic, circuitry, interfaces, and/or code that may be configured to receive a user input. The I/O device 208 may be further configured to provide an output in response to the user input. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display and a speaker.

The network interface 210 may comprise suitable logic, circuitry, interfaces, and/or code that may be configured to establish a communication with the system 102, via the communication network 110. The network interface 210 may be implemented by use of various known technologies to support wired or wireless communication of the system 102 via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the system 102 without departing from the scope of the present disclosure. For example, in some embodiments, the system 102 may include any number of other components that may not be explicitly illustrated or described.

Figure 3:
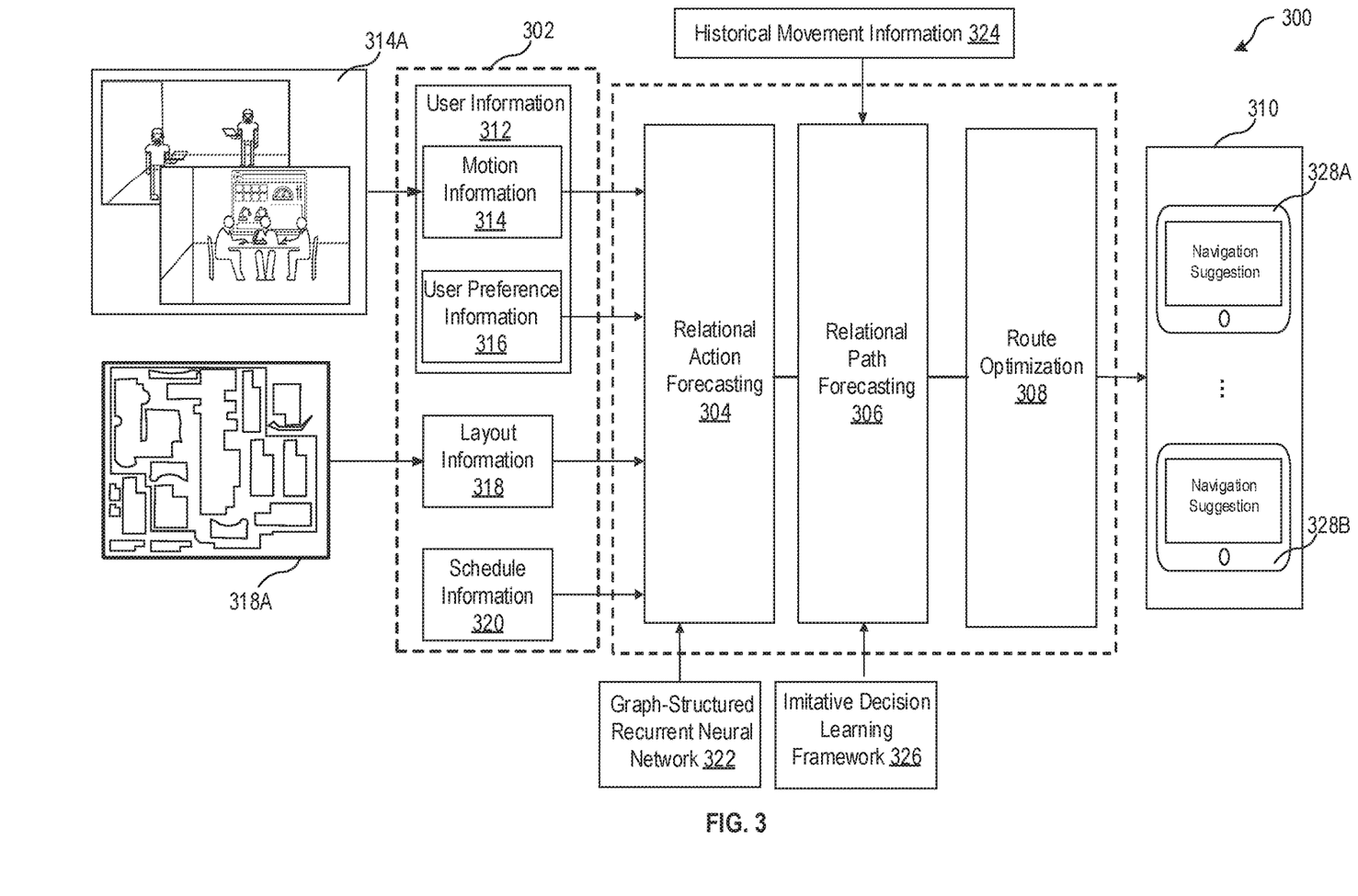
FIG. 3 is a diagram that depicts exemplary operations for providing navigation suggestions in a built environment.

FIG. 3 is a diagram that depicts exemplary operations for providing navigation suggestions in a built environment, in accordance with at least one embodiment of the disclosure. FIG. 3 is explained in conjunction with elements from FIG. 1 and FIG. 2. With reference to FIG. 3, there is shown a block diagram 300 that illustrates exemplary operations from 302 to 310 for providing navigation suggestions. The exemplary operations may be performed by any computing system, for example, by the system 102 of FIG. 1 or FIG. 2.

At 302, data acquisition may be performed. For that, the system 102 may receive user information 312 associated with the group of users 112A, 112B, 112C, and 112D in the built environment 108. The user information 312 may be received from various disparate data sources, such as, but not limited to, user devices (such as smartphones or smart wearables), cameras (such as CCTV or drone cameras), data aggregators (such as third party aggregators) which collect user preferences for events, or other sensors located at multiple locations in the built environment 108. The received user information 312 may include motion information 314 associated with the group of users 112A, 112B, 112C, and 112D in the built environment 108 and user preference information 316 associated with a group of events hosted in the built environment 108.

The motion information 314 associated with the group of users 112A, 112B, 112C, and 112D may be indicative of a user activity and a current user location with respect to a known location or space in the built environment 108. In one or more embodiments, the system 102 may control the plurality of motion trackers 104 inside the built environment 108 to collect the motion information 314. By way of example, and not limitation, each motion tracker may be implemented as an image capture device, such as a CCTV camera installed at a particular location in the built environment 108. In such a case, the system 102 may receive, from the plurality of motion trackers 104, a plurality of images 314A of the group users 302 as the motion information 314. In some instances, multiple image capture devices may be positioned at particular locations to have a combined field-of-view (FOV) which covers one or more locations in the built environment 108 from multiple viewpoints. Images from the multiple viewpoints may be fused to accurately track and identify movements of the group of users 112A, 112B, 112C, and 112. Examples of the image capture device may include, but are not limited to, a wide-angle camera, an action camera, a closed-circuit television (CCTV) camera, a camcorder, a digital camera, a camera phone, a time-of-flight camera (ToF camera), a night-vision camera, and/or other image capture devices.

For each user, the user preference information 316 may include a user preference for one or more events of the group of events hosted in the built environment 108. In one or more embodiments, the system 102 may extract the user preference information 316 from logs of user activity on various user platforms, such as websites, smartphone applications, social media application, or from various data aggregators. Additionally, or alternatively, the user preference information 316 may be extracted based on information associated with events marked in a user's calendar application. Additionally, or alternatively, the user preference information 316 may be extracted from a history of past events attended by each user of the group of users 112A, 112B, 112C, and 112D. Additionally, or alternatively, the user preference information 316 may be extracted based on a user input via an application interface rendered on a display of a user device. The application interface may display a list which includes the group of events to be hosted in the built environment 108 and the user input may include a selection of the one or more events from the displayed list. The selection may indicate a user preference to attend the one or more events.

The system 102 may also receive layout information 318 associated with the built environment 108. The layout information 318 may include a static physical layout 318A of the built environment 108 and/or a dynamic layout indicative of user density at a plurality of locations in the built environment 108. In one or more embodiments, the system 102 may retrieve the static physical layout 318A of the built environment 108 from a server. For example, the server may maintain a repository of 2D/3D layouts of various built environments.

For the dynamic layout, the system 102 may estimate occupancy information associated with the group of users 112A, 112B, 112C, and 112D in the built environment 108 based on the motion information 314. In one or more embodiments, the system 102 may generate a heat map based on the estimated occupancy information. The generated heat map may be overlaid onto the static physical layout 318A to generate the dynamic layout. The heat map, when overlaid, may be indicative of the user density at different locations of the built environment 108. The user density at different locations may change as individual users move, form groups, or when such groups divide over time. In other words, as people move around in the built environment 108, the dynamic layout may be updated as well to display the changes in the user density over time inside the built environment 108.

The system 102 may also receive schedule information 320 associated with the group of events. The schedule information 320 may include an event name for each event of the group of events, an event location of each event of the group of events in the built environment 108, a seating capacity associated with each event of the group of events, and a time or duration associated with each event of the group of events. For example, the group of events hosted in the built environment 108 may be a conference. The schedule information 320 associated with the conference may include an event name such as "Conference on Artificial Intelligence", an event location associated with the conference such as "conference hall 2, second floor", a seating capacity available for the conference as "200", and a time or duration associated with the conference such as "from 3 PM-4 PM on 5 Apr. 2020".

At 304, relational action forecasting may be performed. The system 102 may predict an event-specific action associated with each user of the group of users 112A, 112B, 112C, and 112D in the built environment 108. Such predictions may be performed based on the received user information 312, the received layout information 318, and the received schedule information 320. The event-specific action for each user of the group of users 112A, 112B, 112C, and 112D may indicate a maximum likelihood of movement of the respective user towards a particular location in the built environment 108. In other words, the event-specific action may refer to a most probable action for every person in the built environment 108. For example, possible event-specific actions for a user may be visiting a conference hall or a café in a built environment 108. Based on the received user information 312, the received layout information 318, and the received schedule information 320, it may be predicted that the user may be most likely heading towards the conference hall to attend an event (e.g., Conference on Artificial Intelligence).

For prediction of such actions, the system 102 may consider spatial and temporal interactions between person-person, and person-objects in the built environment 108. In one or more embodiments, the system 102 may provide the received user information 312, the received layout information 318, the received schedule information 320 as input to a graph-structured recurrent neural network 322. In an embodiment, each of the received user information 312, the received layout information 318, and the received schedule information 320 may be converted into separate embeddings, which may be concatenated together and then provided as the input to the graph-structured recurrent neural network 322.

The graph-structured recurrent neural network 322 may be a pre-trained neural network in which nodes may be configured for user detection and edges may be configured to learn spatial or temporal user-to-user interactions and/or user-to-object interactions in the built environment 108. Based on the input, the graph-structured recurrent neural network 322 may select an action label for each user of the group of users 112A, 112B, 112C, and 112D. For each user, the selected action label may have a maximum likelihood from among a plurality of action labels of an action space. The system 102 may predict the event-specific action of each user of the group of users 112A, 112B, 112C, and 112D in the built environment 108 based on the selected action label for the respective user.

In one or more embodiments, the action space may refer to a collection of all possible event-specific actions associated with the group of users 112A, 112B, 112C, and 112D in the built environment 108. For example, in a first scene of a video, a person may be seen reading a book while sitting on a chair. In a subsequent scene, the person may be seen talking to another person standing next to the chair while holding the book in hand. The action space for such a scenario may be that the person may resume reading the book or the person may stand up and leave. Similarly, the action space for event-specific actions may include action labels which indicate locations in the built environment 108 where a user or a crowd may be heading to. For example, the action space may include action labels, such as more people are likely to head towards poster sessions, few people are preferring invited session 3, continuous flow towards café, or no one is likely to go towards the banquet hall.

At 306, relational path forecasting may be performed. For each user of the group of users 112A, 112B, 112C, and 112D, the system 102 may predict a path for navigation towards a first event location associated with one of the group of events. Herein, the path may include a reference to one or more of a location name, a checkpoint, a utility/facility (such as elevators, stairs, or escalators), a floor number, a direction, a sign (e.g., a digital signage), or any identifiable structure in the built environment 108. Such prediction may be performed based on the predicted event-specific action of each user of the group of users 112A, 112B, 112C, and 112D and historical movement information 324 of the group of users 112A, 112B, 112C, and 112D inside the built environment 108. For each user, the historical movement information 324 may include a tracked sequence of past locations visited by the respective user in the built environment 108. For example, for some users, the predicted event-specific action may indicate an intent to attend a poster presentation session on the first floor of a two-floor building. The historical movement information 324 may indicate a movement towards a space which leads to both a staircase and an elevator lobby. Based on the historical movement information 324 and the predicted event-specific actions, the system 102 may predict the path for navigation towards the event location of the poster presentation session. If elevators in the elevator lobby are fairly empty as compared to the staircase, the predicted path may include the elevators as a potential option to move to the first floor.

In one or more embodiments, the system 102 may provide the predicted event-specific actions of the group of users 112A, 112B, 112C, and 112D and the historical movement information 324 of the group of users 112A, 112B, 112C, and 112D as input to an imitative decision learning framework 326. The imitative decision learning framework 326 may be configured to mimic the human decision-making process to predict the paths (i.e. probable upcoming paths) in the built environment 108. In one implementation, the imitative decision learning framework 326 may be based on Generative Adversarial Imitation Learning (GAIL) and may infer latent decisions of individual users in the built environment 108 based on historical observations (i.e. the historical movement information 324).

The imitative decision learning framework 326 may extract, using an inference network, a distribution of latent decisions associated with the group of users 112A, 112B, 112C, and 112D based on the input. Every latent decision may internally determine a motion pattern of a respective user in the built environment 108. The motion pattern may be an outcome of user's decisions, which may be made upon spatiotemporal interactions of the user with other users/objects in the built environment 108.

The imitative decision learning framework 326 may generate a policy for predicting the path for the navigation towards the first event location for each user of the group of users 112A, 112B, 112C, and 112D. For example, the policy generation may be based on the input and the extracted distribution of latent decisions. The system 102 may predict, for each user of the group of users 112A, 112B, 112C, and 112D, the path for the navigation towards the first event location based on the generated policy.

At 308, route optimization may be performed. With the route optimization, the objective is to select an optimal path which a user or a group of users 112A, 112B, 112C, and 112D can take to reach their preferred event location. The system 102 may select, from the predicted paths (obtained at 306) for the group of users 112A, 112B, 112C, and 112D, one or more paths as one or more optimal options for navigation towards the first event location. For example, if there are many people going to an event location, the optimal selection of the one or more paths may depend on a seating capacity of the event location. Thus, if many people are heading towards a poster session but the session can only accommodate 200 people and there is a user who is predicted to follow a path (such as stairs) to attend the poster session, but given a diminishing rate of the seating capacity at the event location, then an optimal option/path for the user may be to either use an elevator (which other users may be opting for) or to skip the poster session to avoid any inconvenience.

In one or more embodiments, the system 102 may determine whether a first path of the predicted paths (obtained at 306) for a first user of the group of users 112A, 112B, 112C, and 112D coincides with a second path of the predicted paths for a second user of the group of users 112A, 112B, 112C, and 112D. In other words, it may be determined whether paths of two or more users coincide or overlap. If yes, then such paths may be merged in order to accommodate a common goal whenever feasible. The system 102 may select the first path as an optimal option for both the first user and the second user for the navigation towards the first event location.

In these or other embodiments, the system 102 may extract constraint information which may include seating capacity information associated with the first event location in the built environment 108 based on the received layout information 318 associated with the built environment 108. For example, the seating capacity of the event location may be determined as 200 based on the dynamic layout of the built environment 108. Based on the extracted constraint information, the system 102 may formulate an objective function of a constrained convex optimization problem for the route optimization. The system 102 may determine, from the group of users 112A, 112B, 112C, and 112D, a first cluster of users who may be moving towards the first event location based on the predicted event-specific actions for the group of users 112A, 112B, 112C, and 112D and the received user preference information 316. From the predicted paths for the group of users 112A, 112B, 112C, and 112D, the system 102 may select the one or more paths as the one or more optimal options for the first cluster of users by minimizing the formulation objective function.

At 310, navigation assistance may be provided. The system 102 may generate one or more navigation suggestions based on the selected one or more paths (at 308). For example, for users who may be moving towards the event location of the poster session, a navigation suggestion may be generated as "Turn right and go up one floor using the elevator". The system 102 may control one or more display devices 106 (such as a display device 328A or a display device 328B) to display the generated one or more navigation suggestions. In one or more embodiments, the system 102 may generate and display the navigation suggestion for a user on a personal display device (such as a smartphone or a smartwatch). Such a suggestion may or may not be personalized for the user. Additionally, or alternatively, if a display device, such as a digital signage is installed at a suitable location in the built environment 108, the system 102 may generate and display a navigation suggestion for a moving crowd of users on the digital signage.

In one or more embodiments, the one or more display devices 106 may be placed in the built environment 108 at key locations where user density at a given point in time may be predicted to be higher than a set threshold. For example, one of such key locations may be an elevator lobby where crowds may assemble to move to a particular floor of the built environment 108. As an individual user or a crowd of users may move towards an event location, the system 102 may control the one or more display devices 106 to display updated navigation suggestions. In one or more embodiments, the system 102 may display, on the one or more display devices 106, a real-time seating capacity associated with the event location along with the navigation suggestions. This may allow users to decide or change their individual preferences or event-specific actions.

In described embodiments, both the graph-structured recurrent neural network 322 and the imitative decision learning framework 326 may be include one or more variants artificial neural networks. Herein, the artificial neural network may be considered as a computational network or a system of artificial neurons as nodes, which may be arranged in the N number of layers. The N number of layers of the artificial neural network may include an input layer, a plurality of intermediate layers (also referred to as hidden layers), and one or more output layers. Each layer of the N number of layers may include one or more nodes (artificial neurons). Outputs of all nodes in the input layer may be coupled to at least one node of the plurality of intermediate layers. Similarly, inputs of each intermediate layer may be coupled to outputs of at least one node in other layers of the artificial neural network. Outputs of each intermediate layer may be coupled to inputs of at least one node in other layers of the artificial neural network. Node(s) in the one or more output layers may receive inputs from at least one intermediate layer to output a result. The number of layers and the number of nodes in each layer may be determined from hyper-parameters of the artificial neural network. Such hyper-parameters may be set before or while training the artificial neural network on a training dataset.

Each node of the artificial neural network may correspond to a mathematical function (e.g., a sigmoid function or a rectified linear unit) with a set of network parameters, tunable during training of the artificial neural network. The set of network parameters may include, for example, a weight parameter, a regularization parameter, and the like. Each node may implement a mathematical function to compute an output based on one or more inputs from nodes in other layer(s) (e.g., previous layer(s)) of the artificial neural network. All or some of the nodes of the artificial neural network may correspond to same or a different mathematical function.

In training of the artificial neural network, one or more network parameters of each node of the artificial neural network may be updated based on whether an output of an output layer for a given input (from the training dataset) matches a correct result based on a loss function for the artificial neural network. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like.

The artificial neural network may include electronic data, which may be implemented, for example, as a software component, and may rely on code databases, libraries, external scripts, or other logic or instructions for execution by a processing device, such as by the system 102 of FIG. 1 or FIG. 2. The artificial neural network may include codes configured to enable a computing device or system, such as the system 102 to perform one or more operations for prediction or event-specific actions or (most probable) paths for the group of users 112A, 112B, 112C, and 112D in the built environment 108. Additionally, or alternatively, the artificial neural network may be implemented using hardware, including, but not limited to a processor, a microprocessor (e.g., to perform or control performance of one or more operations), a field-programmable gate array (FPGA), or an application-specific integrated circuit (ASIC). Alternatively, in some embodiments, the artificial neural network may be implemented using a combination of both hardware and software components.

Figure 4:
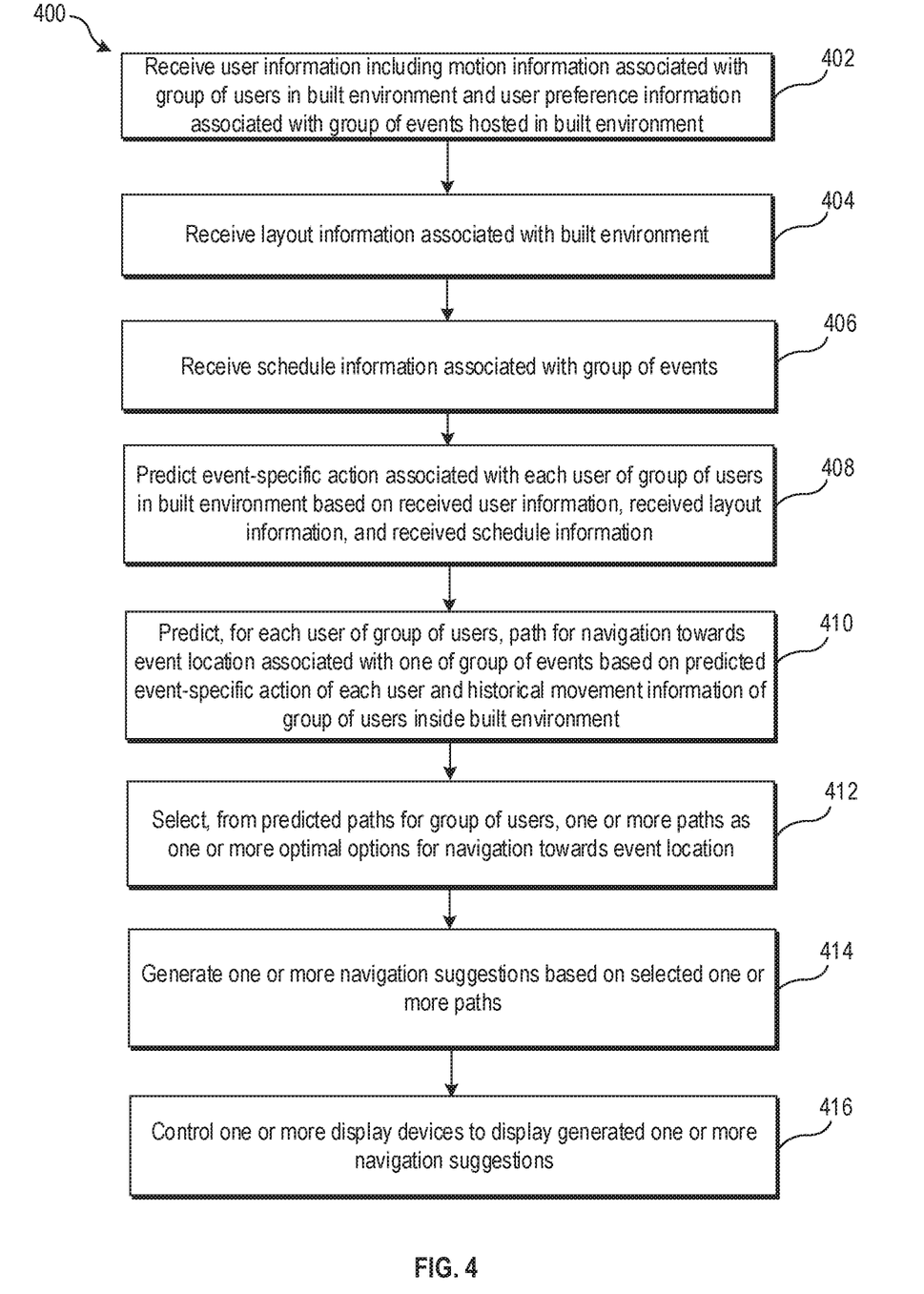
FIG. 4 is a flowchart of an example method of providing navigation suggestions in a built environment, all according to at least one embodiment described in the present disclosure.

FIG. 4 is a flowchart of an example method of providing navigation suggestions in a built environment, according to at least one embodiment described in the present disclosure. FIG. 4 is explained in conjunction with elements from FIG. 1, FIG. 2 and FIG. 3. With reference to FIG. 4, there is shown a flowchart 400. The method illustrated in the flowchart 400 may start at 402 and may be performed by any suitable system, apparatus, or device, such as by the system 102 of FIG. 1 or FIG. 2.

At 402, the user information 312, including the motion information 314 associated with the group of users 112A, 112B, 112C, and 112D in the built environment 108 and the user preference information 316 associated with the group of events hosted in the built environment 108 may be received. In one or more embodiments, the system 102 may be configured to receive the user information 312.

At 404, the layout information 318 associated with the built environment 108 may be received. In one or more embodiments, the system 102 may be configured to receive the layout information 318 which includes a static physical layout 318A of the built environment 108 and a dynamic layout indicative of user density at a plurality of locations in the built environment 108.

At 406, the schedule information 320 associated with the group of events may be received. In one or more embodiments, the system 102 may be configured to receive the schedule information 320. The schedule information 320 may include an event name for each event of the group of events, an event location of each event of the group of events in the built environment 108, a seating capacity associated with each event of the group of events, and a time or duration associated with each event of the group of events.

At 408, an event-specific action associated with each user of the group of users 112A, 112B, 112C, and 112D in the built environment 108 may be predicted. Such prediction may be based on the received user information 312, the received layout information 318, and the received schedule information 320. In one or more embodiments, the system 102 may be configured to predict the event-specific action associated with each user of the group of users 112A, 112B, 112C, and 112D in the built environment 108.

At 410, a path for navigation towards a first event location associated with one of the group of events may be predicted for each user of the group of users 112A, 112B, 112C, and 112D. Such prediction may be based on the predicted event-specific action of each user of the group of users 112A, 112B, 112C, and 112D and historical movement information 324 of the group of users 112A, 112B, 112C, and 112D inside the built environment 108. In one or more embodiments, the system 102 may be configured to predict, for each user of the group of users 112A, 112B, 112C, and 112D, the path for navigation towards the first event location associated with one of the group of events.

At 412, one or more paths may be selected from the predicted paths for the group of users 112A, 112B, 112C, and 112D as one or more optimal options for navigation towards the first event location. In one or more embodiments, the system 102 may be configured to select, from the predicted paths for the group of users 112A, 112B, 112C, and 112D, the one or more paths as the one or more optimal options for navigation towards the first event location.

At 414, one or more navigation suggestions may be generated based on the selected one or more paths. In one or more embodiments, the system 102 may be configured to generate the one or more navigation suggestions based on the selected one or more paths.

At 416, the one or more display devices 106 may be controlled to display the generated one or more navigation suggestions. In one or more embodiments, the system 102 may be configured to control the one or more display devices 106 to display the generated one or more navigation suggestions. Control may pass to end.

Although the flowchart 400 is illustrated as discrete operations, such as 402, 404, 406, 408, 410, 412, 414, and 416. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable storage medium configured to store instructions that, in response to being executed, causes a system (such as the system 102) to perform operations. The operations may include receiving user information, including motion information associated with a group of users in a built environment and user preference information associated with a group of events hosted in the built environment. The operations may further include receiving layout information associated with the built environment and receiving schedule information associated with the group of events. The operations may further include predicting an event-specific action associated with each user of the group of users in the built environment based on the received user information, the received layout information, the received schedule information. The operations may further include predicting, for each user of the group of users, a path for navigation towards a first event location associated with one of the group of events based on the predicted event-specific action of each user of the group of users and historical movement information of the group of users inside the built environment. The operations may further include selecting, from the predicted paths for the group of users, one or more paths as one or more optimal options for navigation towards the first event location and generating one or more navigation suggestions based on the selected one or more paths. The operations may further include controlling one or more display devices to display the generated one or more navigation suggestions.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
receiving user information comprising motion information associated with a group of users in a built environment and user preference information associated with a group of events hosted in the built environment;
receiving layout information associated with the built environment;
receiving schedule information associated with the group of events;
predicting an event-specific action associated with each user of the group of users in the built environment based on the received user information, the received layout information, the received schedule information;
predicting, for each user of the group of users, a path for navigation towards a first event location associated with one of the group of events based on the predicted event-specific action of each user of the group of users and historical movement information of the group of users inside the built environment;
selecting, from the predicted paths for the group of users, one or more paths as one or more optimal options for navigation towards the first event location;
generating one or more navigation suggestions based on the selected one or more paths; and
controlling one or more display devices to display the generated one or more navigation suggestions.

2. The method according to claim 1, further comprising controlling a plurality of motion trackers at a corresponding plurality of locations inside the built environment to collect the motion information associated with the group of users in the built environment.

3. The method according to the claim 2, further comprising receiving, from the plurality of motion trackers at the corresponding plurality of locations inside the built environment, a plurality of images as the motion information of the group of users.

4. The method according to claim 1, wherein the layout information comprises a static physical layout of the built environment and a dynamic layout indicative of user density at a plurality of locations in the built environment.

5. The method according to claim 1, wherein the event-specific action for each user of the group of users indicates a maximum likelihood of movement of a corresponding user towards a location in the built environment.

6. The method according to claim 1, wherein the received schedule information comprises an event name for each event of the group of events, an event location of each event of the group of events in the built environment, a seating capacity associated with each event of the group of events, and a time or duration associated with each event of the group of events.

7. The method according to claim 1, further comprising:
providing the received user information, the received layout information, the received schedule information as input to a graph-structured recurrent neural network, wherein
the graph-structured recurrent neural network is a pre-trained neural network in which nodes are configured for user detection and edges are configured to learn spatial or temporal user-to-user interactions and user-to-object interactions in the built environment, and
the graph-structured recurrent neural network is configured to select, for each user of the group of users, an action label having a maximum likelihood from among a plurality of action labels of an action space based on the input; and
predicting the event-specific action of each user of the group of users in the built environment based on selected action label.

8. The method according to claim 1, further comprising:
providing the predicted event-specific actions of the group of users and the historical movement information of the group of users as input to an imitative decision learning framework,
wherein the imitative decision learning framework is configured to:
extracting a distribution of latent decisions associated with the group of users based on the input; and
generating a policy for predicting the path for the navigation towards the first event location for each user of the group of users based on the input and extracted distribution of latent decisions; and
predicting, for each user of the group of users, the path for the navigation towards the first event location associated with one of the group of events based on the generated policy.

9. The method according to claim 1, further comprising:
determining whether a first path of the predicted paths for a first user of the group of users coincides with a second path of the predicted paths for a second user of the group of users; and
selecting the first path as an optimal option of the one or more optimal options for both the first user and the second user for the navigation towards the first event location.

10. The method according to claim 1, further comprising:
extracting constraint information comprising seating capacity information associated with the first event location in the built environment based on the received layout information associated with the built environment;
formulating an objective function of a constrained convex optimization problem for route optimization based on the extracted constraint information;
determining, from the group of users, a first cluster of users who are moving towards the first event location based on the predicted event-specific actions for the group of users and the received user preference information; and
selecting, from the predicted paths for the group of users, the one or more paths as the one or more optimal options for the first cluster of users to navigate towards the first event location by minimizing the formulation objective function.

11. A non-transitory computer-readable storage medium configured to store instructions that, in response to being executed, causes a system to perform operations, the operations comprising:
receiving user information comprising motion information associated with a group of users in a built environment and user preference information associated with a group of events hosted in the built environment;
receiving layout information associated with the built environment;
receiving schedule information associated with the group of events;
predicting an event-specific action associated with each user of the group of users in the built environment based on the received user information, the received layout information, the received schedule information;
predicting, for each user of the group of users, a path for navigation towards a first event location associated with one of the group of events based on the predicted event-specific action of each user of the group of users and historical movement information of the group of users inside the built environment;

selecting, from the predicted paths for the group of users, one or more paths as one or more optimal options for navigation towards the first event location;

generating one or more navigation suggestions based on the selected one or more paths; and controlling one or more display devices to display the generated one or more navigation suggestions.

12. The non-transitory computer-readable storage medium according to claim 11, wherein the operations further comprises controlling a plurality of motion trackers at a corresponding plurality of locations inside the built environment to collect the motion information associated with the group of users in the built environment.

13. The non-transitory computer-readable storage medium according to claim 12, wherein the operations further comprises receiving, from the plurality of motion trackers at the corresponding plurality of locations inside the built environment, a plurality of images as the motion information of the group of users.

14. The non-transitory computer-readable storage medium according to claim 11, wherein the layout information comprises a static physical layout of the built environment and a dynamic layout indicative of user density at a plurality of locations in the built environment.

15. The non-transitory computer-readable storage medium according to claim 11, wherein the received schedule information comprises an event name for each event of the group of events, an event location of each event of the group of events in the built environment, a seating capacity associated with each event of the group of events, and a time or duration associated with each event of the group of events.

16. The non-transitory computer-readable storage medium according to claim 11, wherein the operations further comprises:

providing the received user information, the received layout information, the received schedule information as input to a graph-structured recurrent neural network, wherein the graph-structured recurrent neural network is a pretrained neural network in which nodes are configured for user detection and edges are configured to learn spatial or temporal user-to-user interactions and user-to-object interactions in the built environment, and the graph-structured recurrent neural network is configured to select, for each user of the group of users, an action label having a maximum likelihood from among a plurality of action labels of an action space based on the input; and predicting the event-specific action of each user of the group of users in the built environment based on selected action label.

17. The non-transitory computer-readable storage medium according to claim 11, wherein the operations further comprises:

providing the predicted event-specific actions of the group of users and the historical movement information of the group of users as input to an imitative decision learning framework, wherein the imitative decision learning framework is configured to:

extracting a distribution of latent decisions associated with the group of users based on the input; and generating a policy for predicting the path for the navigation towards the first event location for each user of the group of users based on the input and extracted distribution of latent decisions; and predicting, for each user of the group of users, the path for the navigation towards the first event location associated with one of the group of events based on the generated policy.

18. The non-transitory computer-readable storage medium according to claim 11, wherein the operations further comprises:

determining whether a first path of the predicted paths for a first user of the group of users coincides with a second path of the predicted paths for a second user of the group of users; and selecting the first path as an optimal option of the one or more optimal options for both the first user and the second user for the navigation towards the first event location.

19. The non-transitory computer-readable storage medium according to claim 11, wherein the operations further comprises:

extracting constraint information comprising seating capacity information associated with the first event location in the built environment based on the received layout information associated with the built environment;

formulating an objective function of a constrained convex optimization problem for route optimization based on the extracted constraint information;

determining, from the group of users, a first cluster of users who are moving towards the first event location based on the predicted event-specific actions for the group of users and the received user preference information; and selecting, from the predicted paths for the group of users, the one or more paths as the one or more optimal options for the first cluster of users to navigate towards the first event location by minimizing the formulation objective function.

20. A system, comprising:

a processor configured to:

receive user information comprising motion information associated with a group of users in a built environment and user preference information associated with a group of events hosted in the built environment;

receive layout information associated with the built environment;

receive schedule information associated with the group of events;

predict an event-specific action associated with each user of the group of users in the built environment based on the received user information, the received layout information, the received schedule information;

predict, for each user of the group of users, a path for navigation towards a first event location associated with one of the group of events based on the predicted event-specific action of each user of the group of users and historical movement information of the group of users inside the built environment;

select, from the predicted paths for the group of users, one or more paths as one or more optimal options for navigation towards the first event location;

generate one or more navigation suggestions based on the selected one or more paths; and control one or more display devices to display the generated one or more navigation suggestions.

\* \* \* \* \*